United States Patent
Kaye et al.

(10) Patent No.: US 9,334,039 B2
(45) Date of Patent: May 10, 2016

(54) COMPOSITE LAMINATE STRUCTURE

(75) Inventors: Allan Kaye, Bristol (GB); Dong Li, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 1795 days.

(21) Appl. No.: 12/672,224

(22) PCT Filed: Aug. 4, 2008

(86) PCT No.: PCT/GB2008/050657
§ 371 (c)(1),
(2), (4) Date: Feb. 4, 2010

(87) PCT Pub. No.: WO2009/019511
PCT Pub. Date: Feb. 12, 2009

(65) Prior Publication Data
US 2011/0220006 A1 Sep. 15, 2011

(30) Foreign Application Priority Data
Aug. 8, 2007 (GB) .................................. 0715303

(51) Int. Cl.
*B64C 1/06* (2006.01)
*B29C 70/76* (2006.01)
(Continued)

(52) U.S. Cl.
CPC .............. *B64C 1/064* (2013.01); *B29C 70/763* (2013.01); *B64C 1/065* (2013.01); *B64C 3/182* (2013.01);
(Continued)

(58) Field of Classification Search
CPC .......... G01C 5/02; B64C 1/064; B64C 1/065; B64C 3/182; B64C 3/185; B64C 2001/0072; G01L 5/00; G01L 5/00052; G01L 1/24; B29C 70/763; B29K 2995/0089; Y02T 50/433; B64F 5/0045; G01M 5/0091; G01M 11/081; G01M 11/08; Y10T 428/2419; Y10T 428/24777
USPC .................. 116/200–201, 203.207; 244/121; 427/427.4, 156, 264; 264/259; 428/121, 192, 33, 119, 413, 615, 621, 428/624–625, 212, 217; 156/327, 330, 242, 156/242.11, 245; 436/56, 156; 73/11.01–12.14; 127/156, 264
See application file for complete search history.

(56) References Cited

U.S. PATENT DOCUMENTS 2,712,507 A * 7/1955 Green ........................... 503/200
3,652,225 A * 3/1972 Coffin et al. ...................... 436/5
(Continued)

FOREIGN PATENT DOCUMENTS

DE 3723450 A1 1/1989
DE 19931981 A1 12/1999
(Continued)

OTHER PUBLICATIONS

GB Search Report for GB0715303.4 dated Dec. 19, 2007.
(Continued)

*Primary Examiner* — Laura Martin
*Assistant Examiner* — Tania Courson
(74) *Attorney, Agent, or Firm* — Hauptman Ham, LLP

(57) ABSTRACT

A structure comprising a composite laminate having an edge; and an impact indicator which is carried by the edge and comprises a resin which fractures upon impact. The fracture provides permanent visible evidence of impact damage, for instance by cracking or by one or more pieces breaking off from the impact indicator. As well as providing such visible evidence of impact damage, the impact indicator may also provide an element of impact protection. Typically the impact indicator is formed from a resin which is more brittle and less strong than the material forming the composite laminate. For instance the material forming the composite laminate may be reinforced, and the resin forming the impact indicator may be un-reinforced.

20 Claims, 3 Drawing Sheets

(51) Int. Cl.
| | |
|---|---|
| *B64C 3/18* | (2006.01) |
| *B64F 5/00* | (2006.01) |
| *G01L 5/00* | (2006.01) |
| *G01M 5/00* | (2006.01) |
| *G01M 11/08* | (2006.01) |
| *G01L 1/24* | (2006.01) |
| *B64C 1/00* | (2006.01) |

(52) U.S. Cl.
CPC ......... *B64C 3/185* (2013.01); *B29K 2995/0089* (2013.01); *B64C 2001/0072* (2013.01); *B64F 5/0045* (2013.01); *G01L 1/24* (2013.01); *G01L 5/0052* (2013.01); *G01M 5/0091* (2013.01); *G01M 11/08* (2013.01); *G01M 11/081* (2013.01); *Y02T 50/433* (2013.01); *Y10T 428/2419* (2015.01); *Y10T 428/24777* (2015.01)

(56) References Cited

U.S. PATENT DOCUMENTS

| | | | | |
|---|---|---|---|---|
| 3,700,534 | A * | 10/1972 | Cook | 428/46 |
| 3,738,857 | A * | 6/1973 | Brockett et al. | 503/207 |
| 3,803,485 | A * | 4/1974 | Crites et al. | 324/693 |
| 3,855,044 | A * | 12/1974 | Riel | 442/19 |
| 3,896,758 | A * | 7/1975 | Di Battista | 116/201 |
| 3,993,828 | A * | 11/1976 | McCorsley, III | 442/244 |
| 4,324,682 | A * | 4/1982 | Weston et al. | 252/301.27 |
| 4,606,961 | A | 8/1986 | Munsen et al. | |
| 4,780,262 | A * | 10/1988 | VonVolkli | 264/512 |
| 4,789,594 | A * | 12/1988 | Stawski | 428/397 |
| 4,855,339 | A * | 8/1989 | Saito et al. | 523/400 |
| 4,917,938 | A * | 4/1990 | Mohan | 428/215 |
| 4,923,203 | A * | 5/1990 | Trimble | B62K 19/16 280/281.1 |
| 4,935,277 | A | 6/1990 | Le Balc'h | |
| 4,958,853 | A * | 9/1990 | Doty | 280/801.1 |
| 5,037,122 | A * | 8/1991 | Beckerer, Jr. | 280/507 |
| 5,242,830 | A | 9/1993 | Argy et al. | |
| 5,316,834 | A * | 5/1994 | Matsuda et al. | 442/247 |
| 5,464,902 | A * | 11/1995 | Recker | 525/119 |
| 5,534,289 | A * | 7/1996 | Bilder et al. | 427/8 |
| 5,806,796 | A * | 9/1998 | Healey | 244/117 R |
| 5,905,260 | A * | 5/1999 | Sage et al. | 850/59 |
| 6,479,124 | B1 | 11/2002 | Porte et al. | |
| 6,524,646 | B2 * | 2/2003 | Kocsis et al. | 427/142 |
| 6,609,865 | B2 * | 8/2003 | Daigneault | 411/13 |
| 6,666,941 | B2 * | 12/2003 | Nakamura | 156/155 |
| 6,710,328 | B1 * | 3/2004 | Mastro et al. | 250/227.14 |
| 6,964,723 | B2 * | 11/2005 | Lindsay et al. | 156/285 |
| 7,237,751 | B2 * | 7/2007 | Anning | 244/123.3 |
| 7,341,777 | B2 * | 3/2008 | Takahashi et al. | 428/323 |
| 7,546,864 | B2 * | 6/2009 | Kaye | 156/467 |
| 7,647,809 | B1 * | 1/2010 | Cooney | 73/12.01 |
| 7,652,075 | B2 * | 1/2010 | Lang | B29C 44/5636 156/245 |
| 7,799,842 | B2 * | 9/2010 | Anderson et al. | 522/148 |
| 7,866,605 | B2 * | 1/2011 | Lee et al. | 244/121 |
| 7,913,538 | B2 * | 3/2011 | Brassier et al. | 73/12.01 |
| 7,942,032 | B2 * | 5/2011 | Walker et al. | 73/12.08 |
| 7,942,368 | B2 * | 5/2011 | Lloyd | 244/123.1 |
| 7,959,753 | B2 * | 6/2011 | Nunez Delgado et al. | 156/245 |
| 8,059,008 | B2 * | 11/2011 | Marincak | 340/657 |
| 8,092,315 | B2 * | 1/2012 | Swartz et al. | 473/237 |
| 8,276,846 | B2 * | 10/2012 | Lloyd | 244/121 |
| 8,348,621 | B2 * | 1/2013 | Lafont | B64C 11/205 416/226 |
| 8,366,045 | B2 * | 2/2013 | Goncalves De Oliveira | 244/129.1 |
| 8,485,102 | B2 * | 7/2013 | Carlson et al. | 102/513 |
| 8,689,644 | B2 * | 4/2014 | Dubost | 73/862.381 |
| 8,691,383 | B2 * | 4/2014 | Georgeson et al. | 428/402.2 |
| 8,722,751 | B2 * | 5/2014 | Scherble | B32B 5/18 521/149 |
| 9,017,511 | B2 * | 4/2015 | Cantrell | B64F 1/005 156/169 |
| 2002/0000128 | A1 * | 1/2002 | Williams | 73/762 |
| 2003/0075953 | A1 | 4/2003 | Hirota et al. | |
| 2005/0183818 | A1 * | 8/2005 | Zenkner et al. | 156/285 |
| 2005/0281999 | A1 * | 12/2005 | Hofmann et al. | 428/304.4 |
| 2006/0186260 | A1 * | 8/2006 | Magnuson et al. | 244/1 R |
| 2006/0226577 | A1 * | 10/2006 | Lin | 264/321 |
| 2006/0234007 | A1 | 10/2006 | Durand et al. | |
| 2007/0197383 | A1 * | 8/2007 | Koene et al. | 503/201 |
| 2008/0087768 | A1 | 4/2008 | Lloyd | |
| 2008/0277596 | A1 * | 11/2008 | Oxley | 250/462.1 |
| 2008/0308669 | A1 | 12/2008 | Lloyd | |
| 2009/0041972 | A1 * | 2/2009 | Rodman | 428/85 |
| 2009/0095164 | A1 * | 4/2009 | Celeste | 99/285 |
| 2009/0304905 | A1 * | 12/2009 | Graham et al. | 427/8 |
| 2010/0264274 | A1 * | 10/2010 | Bradley et al. | 244/135 R |
| 2011/0008587 | A1 * | 1/2011 | Ruskin | 428/192 |
| 2011/0115115 | A1 * | 5/2011 | Winter | 264/175 |
| 2011/0180959 | A1 * | 7/2011 | Donnelly et al. | 264/241 |
| 2013/0108828 | A1 * | 5/2013 | Cantrell et al. | 428/124 |
| 2013/0164471 | A1 * | 6/2013 | Suzuki et al. | 428/35.7 |
| 2014/0224043 | A1 * | 8/2014 | Tighe | 73/865.8 |
| 2015/0181340 | A1 * | 6/2015 | Noda | H04R 31/003 181/157 |
| 2015/0252182 | A1 * | 9/2015 | Wang | C08G 59/32 523/427 |

FOREIGN PATENT DOCUMENTS

| | | |
|---|---|---|
| GB | 2107213 A | 4/1983 |
| GB | 2194062 A | 2/1988 |
| JP | 1112617 A | 5/1989 |
| JP | 2001-31781 A | 2/2001 |
| JP | 2001031781 A | 6/2001 |
| WO | 2005082470 A1 | 9/2005 |
| WO | 2006/105290 A2 | 10/2006 |

OTHER PUBLICATIONS

ISR and Written Opinion for PCT/GB2008/050657 mailed Nov. 6, 2008.

Decision for rejection issued in Chinese application No. 200880102444.9 dated Feb. 8, 2010.

Japanese Office Action with English translation dated May 17, 2013.

* cited by examiner

COMPOSITE LAMINATE STRUCTURE

RELATED APPLICATIONS

The present application is national phase of PCT/GB2008/050657 filed Aug. 4, 2008, and claims priority from British Application Number 0715303.4 filed Aug. 8, 2007, the disclosures of which are hereby incorporated by reference herein in their entirety.

FIELD OF THE INVENTION

The present invention relates to a composite laminate structure, and a method for indicating impact damage in such a structure. In particular, although not exclusively, the structure may form part of an aircraft component.

BACKGROUND OF THE INVENTION

Many aircraft components are made from composite laminate materials. For example, a stringer in an aircraft wing, stiffeners and spar structures, may all be in the form of composite laminate structures. While the structures may be strong when loaded in the way in which they have been designed to be loaded, they may be vulnerable to impact damage, which may result in delamination occurring. Delamination may result in the structure weakening and eventually failing. Particularly vulnerable are the edges of composite laminate structures (at which the layers of the composite laminate structure terminate) where an impact occurs, particularly if the impact is end-on (i.e. when the impact is in a direction perpendicular to the edge and parallel to the plane of the laminates that make up the structure).

If an impact has a significant component of force in the end-on direction the impact may be capable of damaging the bonding between the laminate's layers comprising the composite laminate structure and causing, or adding to the effect of, delamination. Such impacts may be as a result of workmen dropping tools whilst working on the structure, during maintenance for example when the end surfaces of the composite laminate structures are exposed in a way they are usually not. A further way in which the composite laminate structures may be damaged is as a result of wear over time, such wear for example resulting from workmen sitting, or standing, on the structure or contacting the structure directly or by means of tools, or other equipment. It is for example common for a workman to rest tools or toolboxes on the end surface of such structures while working on the aircraft. The edge of a composite laminate structure is typically exposed, at least during maintenance, to direct wear and direct impacts as described above. Similar impact threat exists during the manufacturing and assembly of the composite parts.

When designing an aircraft component, factors that affect the strength and other mechanical properties of composite laminate structures of the aircraft, such as those factors described above, are taken into account. Thus, factors such as those described above typically mean that the composite laminate structures need to be provided with extra strength, resulting in an increase in size and weight.

One known approach to strengthening the edge of a laminar composite is to apply an edge protector—for example as described in US2006/0234007. Another solution is to form the composite laminate with a roll-form edge—that is, an edge formed by a folded layer. However a problem with these conventional methods is that they may not provide sufficient visual evidence of an impact. Such visual evidence may be a requirement of the structure.

SUMMARY OF THE INVENTION

A first aspect of the invention provides a structure comprising a composite laminate having an edge; and an impact indicator which is carried by the edge and comprises a resin which fractures upon impact.

A second aspect of the invention provides a method of indicating impact damage in such a structure, the method comprising fracturing the impact indicator.

The fracture provides permanent visible evidence of impact damage, for instance by cracking or by one or more pieces breaking off from the impact indicator. As well as providing such visible evidence of impact damage, the impact indicator may also provide an element of impact protection by absorbing part of the impact energy.

Typically the impact indicator comprises a resin which is more brittle and less strong than the material forming the composite laminate. For instance the material forming the composite laminate may be reinforced, and the resin forming the impact indicator may be un-reinforced.

Typically the composite laminate comprises a thermosetting material such as an epoxy resin. The material forming the impact indicator may be formed from the same thermosetting resin, or from a resin which cures at a similar or lower temperature.

The impact indicator may be limited in length, or may comprises a strip which runs along at least the majority of the length of the edge.

In certain embodiments of the invention, a plurality of layers of the composite laminate terminate at the edge. Alternatively the edge may be a roll-form edge formed by a folded layer.

The impact indicator may be adhered to the edge by co-curing, co-bonding, or secondary bonding. In the case where the impact indicator is adhered to the edge by co-curing, the impact indicator may be formed integrally with the composite laminate (for instance by forming the composite laminate with a resin-rich edge).

In one example the impact indicator is applied to the edge by extruding resin from a nozzle, and then co-bonding the extruded material to the edge by curing it.

In another example the impact indicator is applied by providing a bead of thermosetting resin in a female mould; inserting the edge of the composite laminate into the female mould; and heating the bead and the composite laminate so that the composite laminate cures and the bead is co-cured to the edge.

In another example the composite laminate comprises a reinforcement phase and a matrix resin phase, and the impact indicator is formed by inserting the edge of the composite laminate into a female mould; providing a gap between the edge and the female mould; and heating the composite laminate so that the matrix resin phase flows into the gap and forms the impact indicator.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
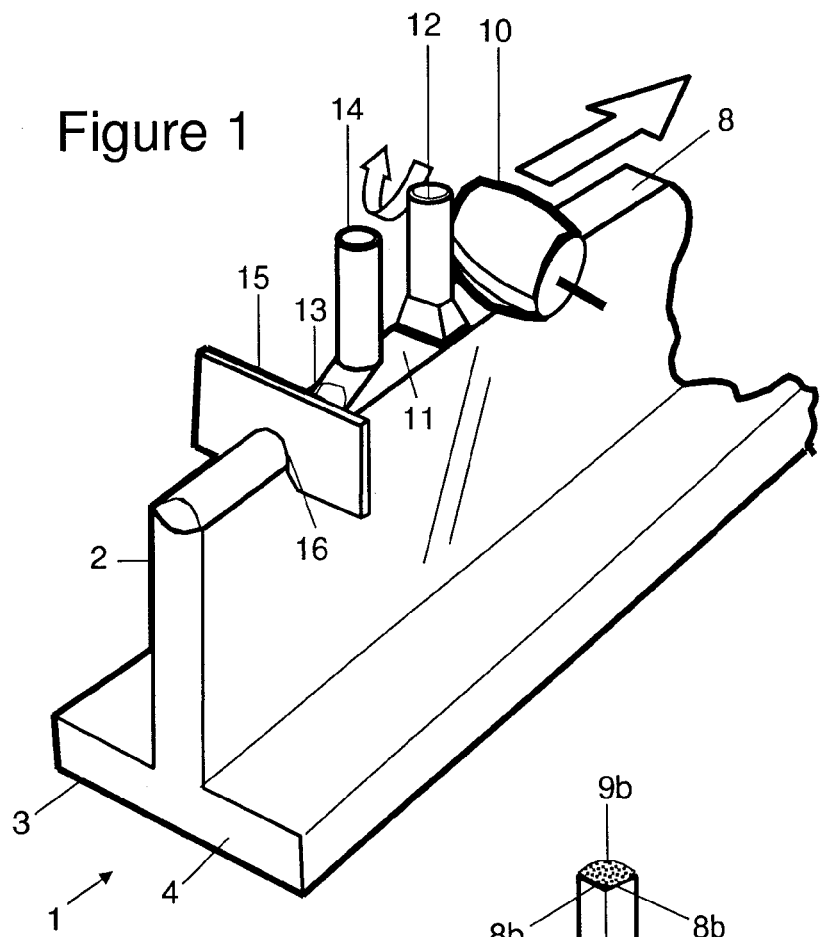
FIG. 1 is a perspective view of a method of applying an impact indicator to a stringer.
Figure 3:
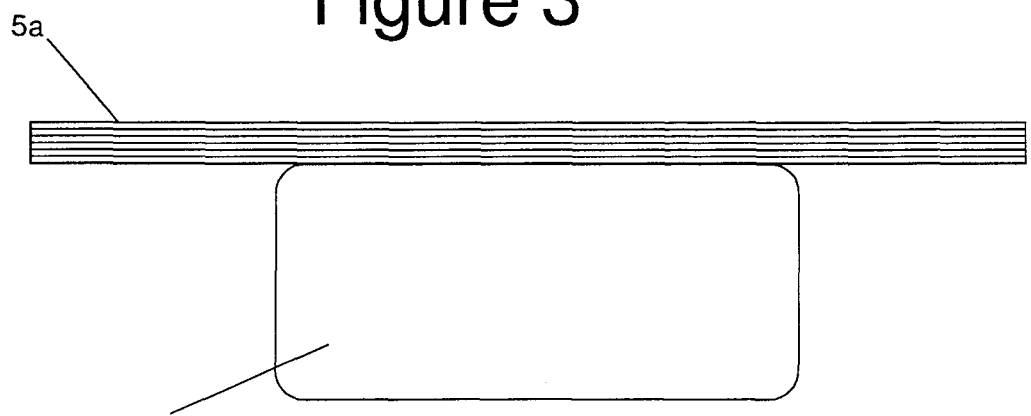
FIGS. 3-5 show three steps in the formation of the stringer.

A stringer 1 shown in FIG. 1 comprises a blade 2 and a pair of flanges 3,4. The stringer is formed by the process illustrated in FIGS. 3-5. In a first step, a planar charge 5a is placed on a male forming tool 6. The charge 5 comprises a laminate structure formed from a stack of sheets, each sheet comprising a plurality of unidirectional carbon fibres impregnated by a thermosetting epoxy resin. These sheets are conventionally known as "prepregs". Individual prepreg sheets are shown schematically in FIG. 3 but not in the other figures for purposes of clarity.

Figure 2:
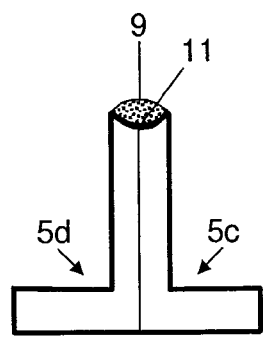
FIG. 2 is an end view of the stringer carrying the impact indicator.
Figure 4:
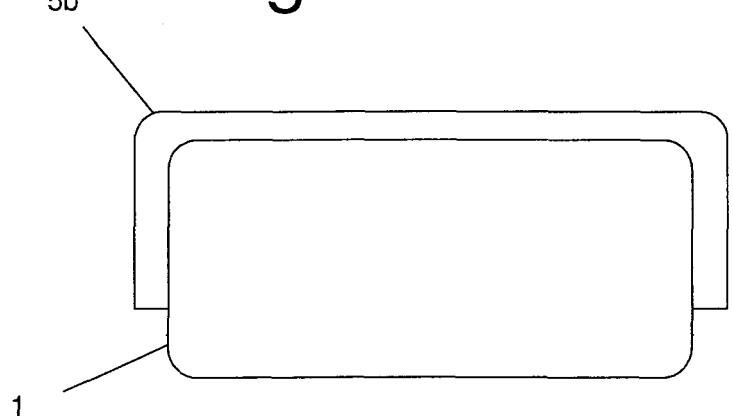
Figure 5:
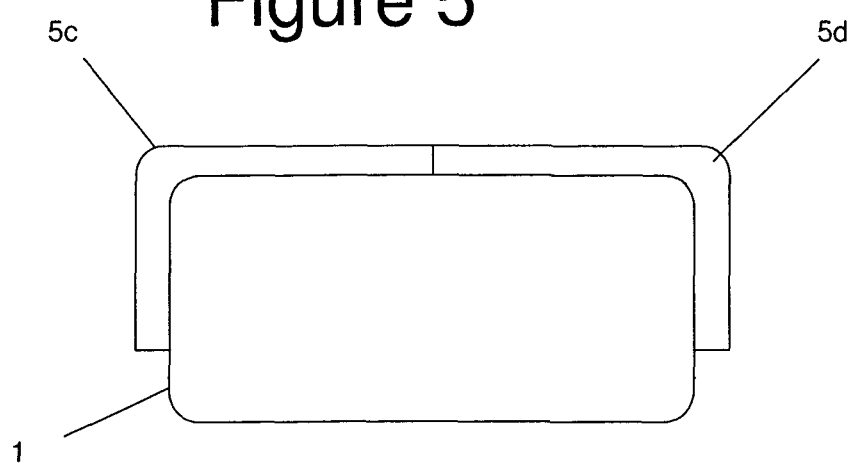

The charge 5a is then deformed over the mould tool as shown in FIG. 4 to form a U-shaped part 5b. The U-shaped part 5b is then cut into two L-shaped parts 5c,5d as shown in FIG. 5; and the parts 5c,5d are placed back-to-back as shown in FIG. 2. Once the L-shaped parts 5c,5d have been placed back-to-back, they are co-cured to harden the stringer and join the parts together.

The direction of the length of the stringer 1 is defined as 0 degrees, and the direction of the height of the stringer is defined as 90 degrees. The lay-up of the stringer is represented by a notation representing the percentage of the fibres in the stringer that are oriented in the directions 0 degrees/±45 degrees/90 degrees. A typical stringer lay-up is 60/30/10. Therefore, 60 percent of the fibres are oriented in the 0 degree direction, 30 percent in the ±45 degree directions and 10 percent in the 90 degree direction.

The stringer includes an exposed top edge 8 which is machined and sealed (after curing) by the process shown in FIG. 1.

A shaped machine cutter 10 moves along the edge 8, removing material to form a groove 11 shown in FIG. 2. A cleaning device 12 removes the material generated by the machining process. A bead 13 is applied to the groove by extruding liquid epoxy resin from a nozzle 14. A finishing tool 15 has a slot 16 with a desired shape, and the tool 15 is moved along the edge behind the nozzle 14 to remove excess resin from the bead 13.

Note that these processes are performed inline so that the bead 13 is applied at the same time that the edge 8 is machined.

The resin is then cured to co-bond the bead to the edge 8, forming an impact indicator 9 shown in FIG. 2 seated in the groove 11.

Figure 6:
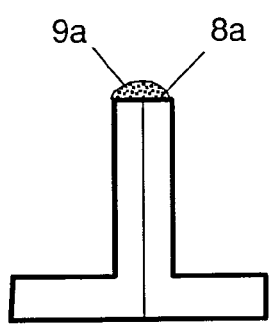
FIG. 6 is an end view of an alternative stringer carrying an impact indicator.

Note that the machining step may be omitted so that the top edge of the stringer is flat as shown at 8a in FIG. 6. In an alternative embodiment shown in FIG. 7, the plies of prepreg may slide with respect to each other during the deformation step shown in FIG. 4, so that the L-shaped parts have angled edges 8b at which the sheets of prepreg terminate. Thus the groove is formed in this case without requiring a separate machining step.

Figure 7:
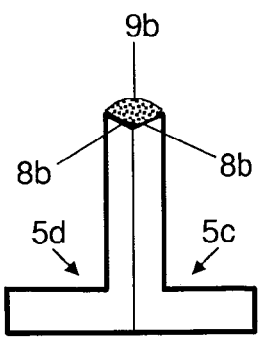
FIG. 7 is an end view of a further alternative stringer carrying an impact indicator.

In the cases of FIGS. 6 and 7 the stringer and impact indicators 9a,9b may be co-cured instead of being cured at different times.

Figure 8:
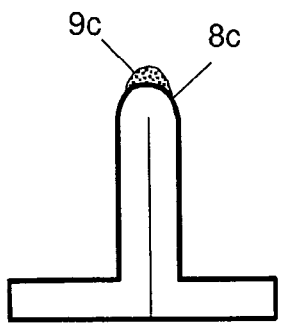
FIG. 8 is an end view of a roll-form stringer carrying an impact indicator.

A roll-form stringer is shown in FIG. 8. This is formed from a single stack of prepreg plies which is folded to form a roll-form edge 8c. An impact indicator 9c is attached to the roll-form edge 8c by extruding a resin bead and co-bonding it to the roll-form edge 8c.

Figure 9:
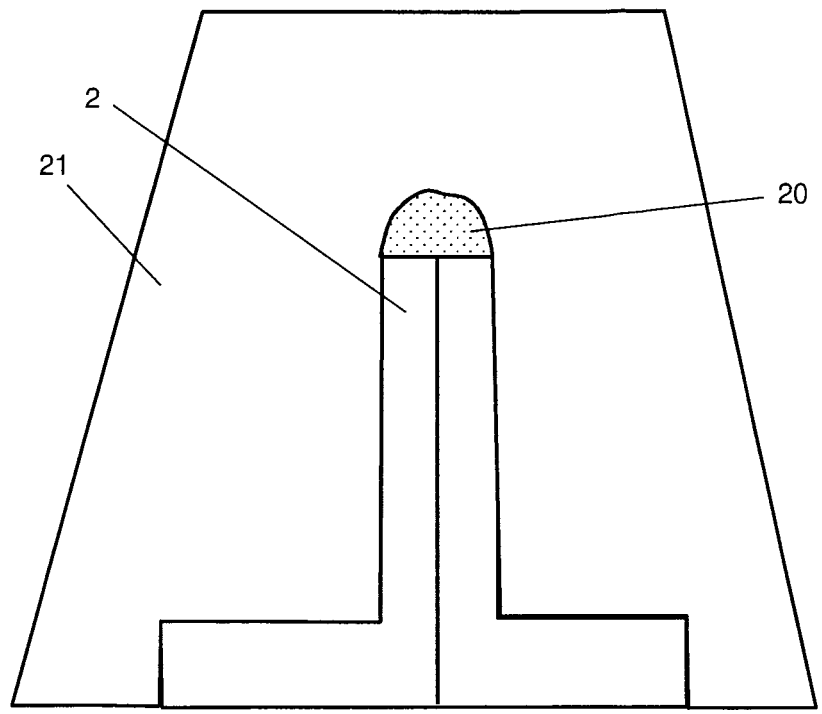
FIG. 9 is an end view of a co-curing manufacturing process.

In an alternative manufacturing process shown in FIG. 9, the impact indicator is applied to the edge of the stringer by providing a bead 20 of uncured epoxy resin in a female mould 21; inserting the stringer blade 2 into the female mould; and heating the mould assembly so that the stringer and bead 20 become bonded to each other by co-curing.

Figure 10:
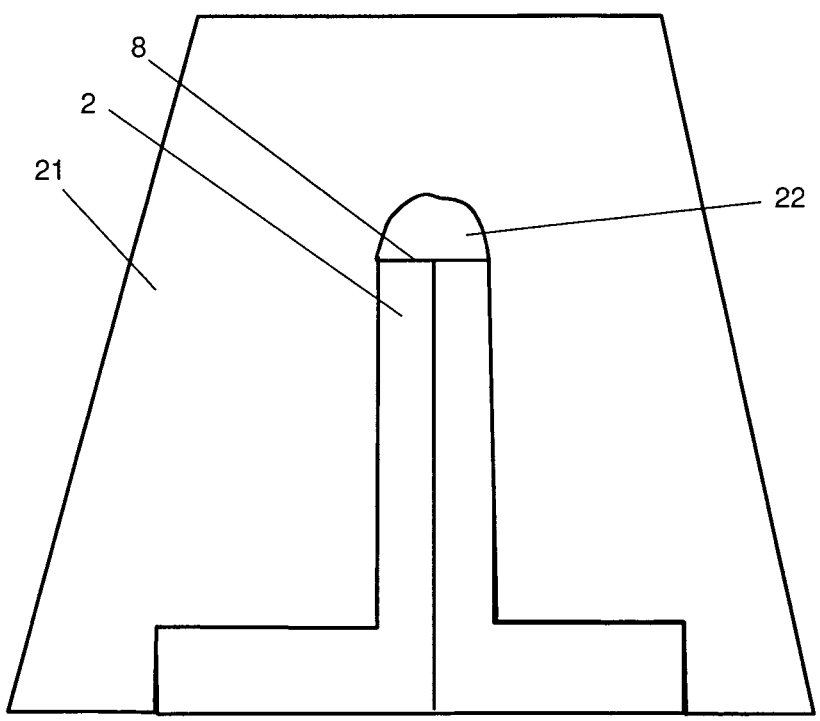
FIG. 10 is an end view of a manufacturing process in which the impact indicator is formed integrally with the stringer.

In a further alternative manufacturing process shown in FIG. 10 the impact indicator is formed integrally with the stringer by inserting the stringer blade into the female mould 21; providing a gap 22 between the edge 8 and the female mould; and heating the stringer so that the epoxy resin matrix in the blade flows into the gap 22 to form the impact indicator.

The impact indicators described above are formed from a material which fractures upon impact, resulting in one or more cracks and/or one or more pieces breaking off. EA9394 epoxy resin has been found to provide the necessary fracture properties, but other materials may be envisaged. For instance the resin may cure at room temperature so that the bead does not have to be heated in order to cure it.

Note that the impact indicators are formed from a resin which is more brittle and less strong than the material forming the composite laminate. For example un-reinforced EA9394 resin is more brittle and less strong than the carbon-fibre reinforced prepregs which form the composite laminate. Also, the impact indicators each have a curved convex outer surface, and a thickness which varies across the width of the edge. This has a number of benefits:

it makes them more prone to fracture than a flat strip;

it makes it more likely that one or more pieces will break off after fracture; and it makes any post-fracture cracks or voids more easily visible from the side.

Although the invention has been described above with reference to one or more preferred embodiments, it will be appreciated that various changes or modifications may be made without departing from the scope of the invention as defined in the appended claims.

The invention claimed is:

1. A structure comprising a composite laminate having an edge; and an impact indicator which is carried by the edge and comprises a resin which fractures upon impact, wherein the resin is un-reinforced, wherein the resin is configured to fracture and provide permanent visible evidence of impact damage.

2. The structure of claim 1 wherein the impact indicator comprises a resin which is more brittle and less strong than the material forming the composite laminate.

3. The structure of claim 1 wherein the impact indicator comprises an epoxy resin.

4. The structure of claim 1 wherein the resin comprises a thermosetting resin which cures at a temperature lower than 100° C.

5. The structure of claim 1 wherein the composite laminate comprises a thermosetting material which cures at a first temperature; and the resin comprises a thermosetting material which cures at a second temperature which is lower than the first temperature.

6. The structure of claim 1 wherein the impact indicator is seated in a groove in the edge.

7. The structure of claim 1 wherein the impact indicator comprises a strip which runs along at least the majority of the length of the edge.

8. The structure of claim 1 wherein a plurality of layers of the composite laminate terminate at the edge.

9. The structure of claim 1, wherein the edge is a roll-form edge formed by a folded layer of the composite laminate.

10. The structure according to claim 1, wherein the structure is an aircraft component.

11. A method of indicating impact damage in the structure of claim 1, the method comprising fracturing the resin of the impact indicator.

12. The method of claim 11 further comprising breaking off one or more pieces from the impact indicator.

13. A method of manufacturing a structure according to claim 1, the method comprising applying the impact indicator to the edge by extruding resin from a nozzle.

14. A method of manufacturing a structure according to claim 1, the method comprising co-curing the impact indicator to the edge.

15. The method of claim 14 wherein the impact indicator is applied by providing a bead of thermosetting resin in a female mould; inserting the edge of the composite laminate into the female mould; and heating the bead and the composite laminate so that the composite laminate cures and the bead is co-cured to the edge.

16. A method of manufacturing a composite laminate structure according to claim 1, wherein each layer of the composite laminate comprises a reinforcement phase and a matrix resin phase, the method comprising forming the impact indicator by inserting the edge of the composite laminate into a female mould; providing a gap between the edge and the female mould; and heating the composite laminate so that the matrix resin phase flows into the gap and forms the impact indicator.

17. The structure of claim 1 wherein the resin comprises a thermosetting resin which cures at a temperature lower than 50° C.

18. A structure comprising a composite laminate having an edge; and an impact indicator which is carried by the edge and comprises a resin which is configured to fracture upon impact and provide permanent visible evidence of impact damage, wherein the impact indicator has a thickness which varies across the width of the edge.

19. The structure of claim 18 wherein the resin is un-reinforced.

20. The structure of claim 18 wherein the outer surface of the impact indicator is convex.

* * * * *